United States Patent
Brummer et al.

[11] 3,893,501
[45] July 8, 1975

[54] VEHICLE WHEEL SKID CHAINS

[76] Inventors: William J. Brummer, 6930 S. 123rd St., No. 186, Seattle, Wash. 98178; Richard F. Brummer, 31055 168th Way S.E., Auburn, Wash. 98002

[22] Filed: Sept. 24, 1974

[21] Appl. No.: 508,764

[52] U.S. Cl.............................. 152/213 R; 152/218
[51] Int. Cl.²......................................... B60C 27/10
[58] Field of Search.... 152/213 R, 213 A, 217–242, 152/170, 185

[56] References Cited
UNITED STATES PATENTS

| | | | |
|---|---|---|---|
| 3,031,000 | 4/1962 | Sebena............................ | 152/225 X |
| 3,106,949 | 10/1963 | Timmons........................ | 152/242 X |

*Primary Examiner*—Robert B. Reeves
*Assistant Examiner*—Larry H. Martin
*Attorney, Agent, or Firm*—Clarence A. O'Brien; Harvey B. Jacobson

[57] ABSTRACT

A skid chain construction is provided including at least one pair of skid chain assemblies and each skid chain assembly includes a pair of generally arcuate and parallel anchor assemblies. A plurality of elongated flexible traction members extend between and are secured to corresponding portions of the anchor assemblies spaced therealong. A mounting adapter plate including a central portion provided with a pattern of apertures formed therethrough for registry with the wheel mounting lugs of a vehicle hub portion is also provided and may be mounted on an associated vehicle hub portion between the hub portion and the associated vehicle wheel. The adapter plate includes at least one pair of diametrically opposite radially outwardly extending support arms including outer end portions deflected outwardly to one side of the adapter plate and the outer end portions of the support arms have corresponding ends of a pair of elongated attaching links pivotally attached thereto for oscillation about parallel axes disposed generally normal to the plane in which the adapter plate is disposed. Corresponding anchor assemblies of the pair of skid chain assemblies have their mid-portions attached to the other pair of ends of the attaching links and longitudinally spaced portions of each of the other anchor assemblies have lengths of elongated flexible tension members anchored thereto. An elongated adjustable length tension member is secured between the ends of the pairs of lengths of flexible tension members remote from the corresponding anchor assemblies and the adjustable length tension member may be utilized to tighten the pair of skid chain assemblies about an associated vehicle wheel with the elongated flexible traction members extending over the tread portions of the wheels.

9 Claims, 10 Drawing Figures

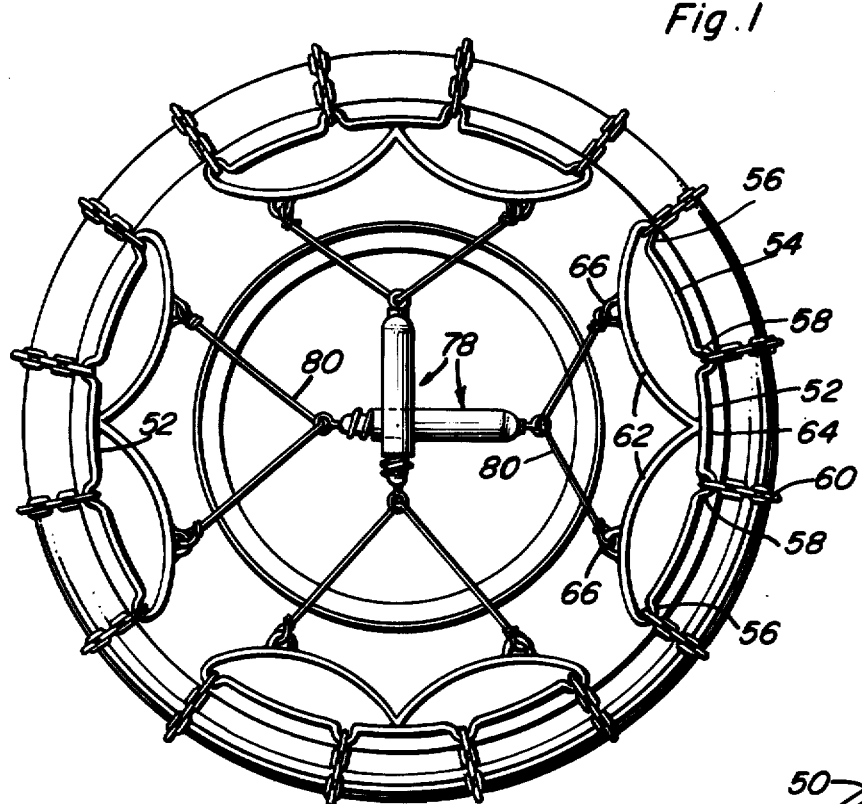
Fig. 1
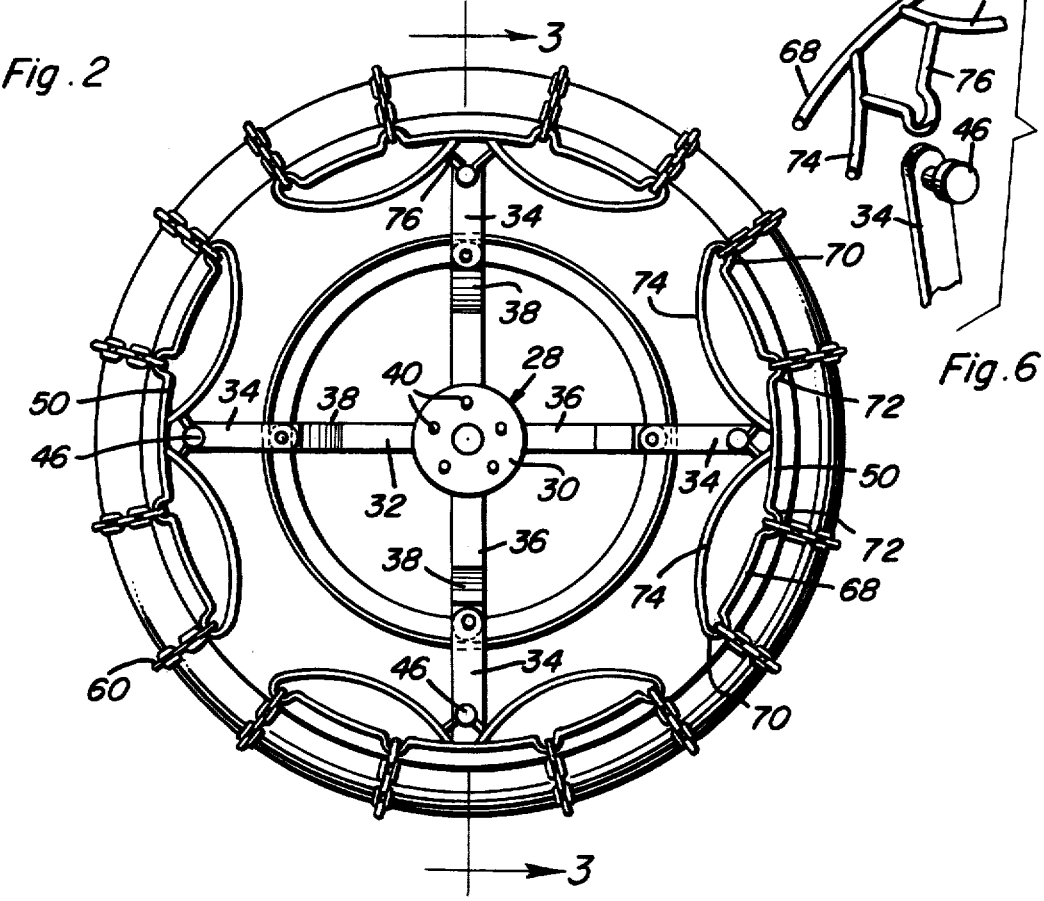
Fig. 2
Fig. 6

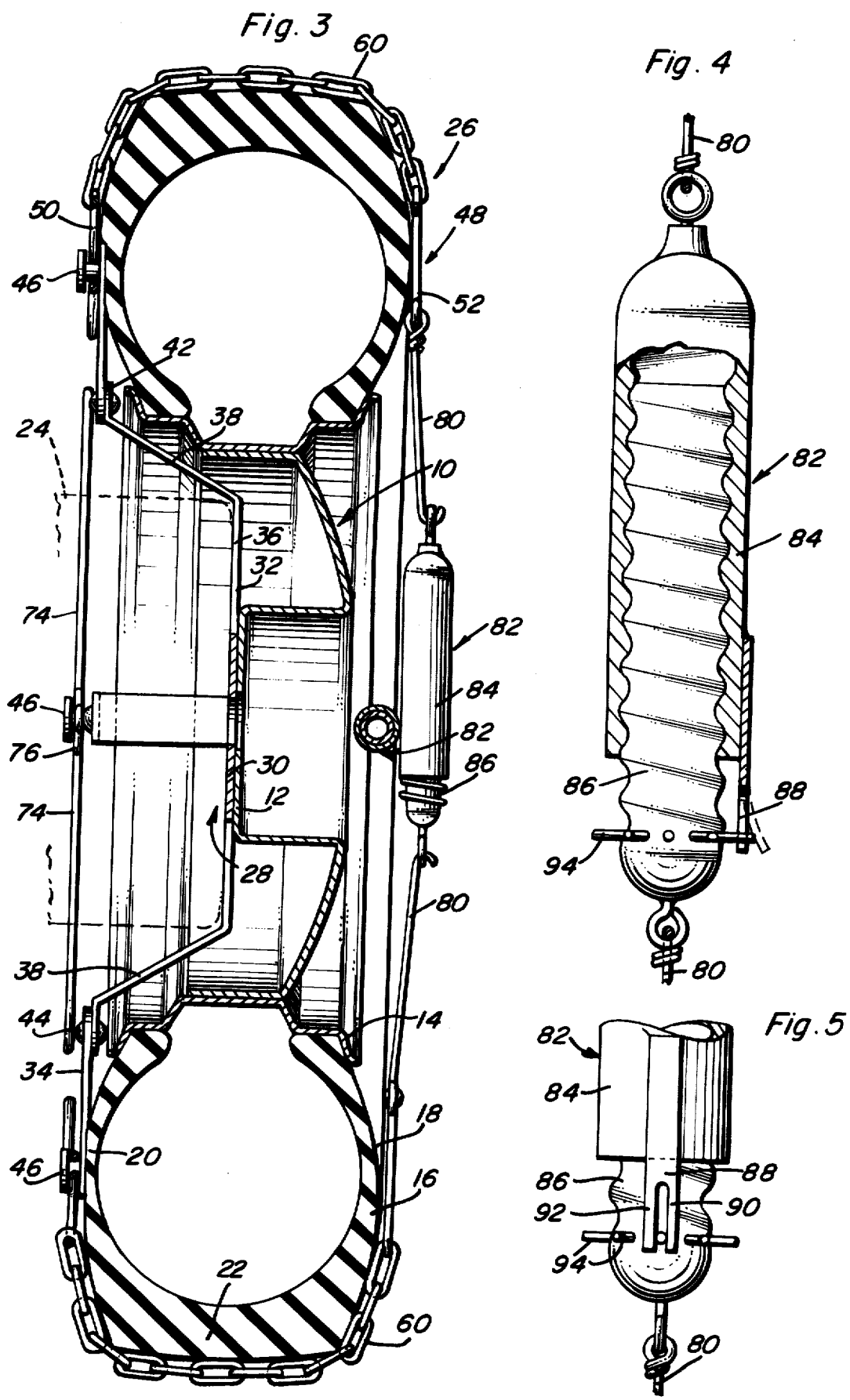

VEHICLE WHEEL SKID CHAINS

BACKGROUND OF THE INVENTION

Various types of skid chain assemblies have been heretofore designed for ease in attachment to vehicle wheels. Examples of these previously patented devices may be found in U.S. Pat. Nos. 1,523,499, 1,562,640, 1,585,336, 2,507,037, 1,745,273, 1,885,603, 2,474,521, 2,639,753, 2,751,958, 3,018,811, 3,091,274 and 3,481,384.

While some of the previously patented skid chain assemblies designed for ease in attachment to vehicle wheels are reasonably quickly attached to a vehicle wheel, a wheel to which these types of skid chains may be secured must first be adapted specifically to receive the skid chains. Further, while other types of reasonably readily attachable skid chains have been designed and do not require specific modification of a vehicle wheel with which the skid chains are to be used, these latter types of skid chains are somewhat more troublesome to apply and are complex in construction as well as more difficult to attach and less adaptable for superior operation under varying road conditions.

BACKGROUND OF THE INVENTION

The skid chain construction of the instant invention has been specifically designed for ease in attachment to an existing vehicle wheel and without specific modifications to the vehicle wheel itself being required in order to enable attachment of the skid chain construction thereto. In addition, the skid chain construction of the instant invention has also been designed in a manner so as to be non-complex in construction and attachable to an associated vehicle wheel in a manner such that superior operation of the skid chain construction may be realized during operation under various road conditions.

The skid chain construction utilizes pairs of diametrically opposite skid chain assemblies which are adapted to be anchored on the back side of the associated wheel by means of an armed adapter plate clamped between the back side of the associated vehicle wheel and the vehicle hub portion to which the wheel is secured. Further, the skid chain construction of the instant invention includes a reasonably simple diametric tension assembly for use on the outer side of the wheel which is adjustable in effective length and may therefore be utilized to clamp a pair of diametrically opposite skid chain assemblies about the associated vehicle wheel.

The main object of this invention is to provide a skid chain construction which may be readily attached to an associated vehicle wheel.

Another object of this invention is to provide a skid chain construction which utilizes anchor portions for the inner sides of the skid chain construction previously supported from the associated vehicle wheel by means of a supporting mounting plate clamped between the back side of the associated vehicle wheel and the vehicle hub portion to which the wheel is secured.

Yet another object of this invention is to provide a skid chain construction constructed in a manner such that a minimum number of different size skid chains may be utilized on vehicle wheels of different sizes with only the mounting plate portion for those portions of the skid chain assembly for disposition behind the inner side of an associated wheel being constructed of different sizes to fit vehicle wheels which vary to a large extent in diameter.

Another important object of this invention is to provide a skid chain construction which will be capable of tightly clampingly engaging an associated vehicle wheel and yet which may be readily mounted on and removed from the associated vehicle wheel and render high efficiency of operation under varying road conditions.

A final object of this invention to be specifically enumerated herein is to provide a skid chain construction which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the outer side of a vehicle wheel having a first form of skid chain construction of the instant invention mounted thereon;

FIG. 2 is a side elevational view of the back side of the vehicle wheel illustrated in FIG. 1;

FIG. 3 is an enlarged vertical sectional view taken substantially upon the plane indicated by the section line 3—3 of FIG. 2;

FIG. 4 is an enlarged side elevational view of the adjustable section of the elongated tensioning structure utilized to secure a pair of skid chain assemblies across the outer side of an associated wheel and with parts of the adjustable length section being broken away and illustrated in vertical section;

FIG. 5 is a fragmentary side elevational view of one end portion of the adjustable length center portion of the outer side tensioning assembly illustrating the manner in which the adjustable length center portion is retained in adjusted length conditions;

FIG. 6 is a fragmentary exploded perspective view illustrating the manner in which the arcuate anchor assemblies of the skid chain construction for disposition behind the inner side of an associated wheel may be removably attached to the mounting adapter plate portion of the skid chain construction to be clamped between the back side of an associated wheel and a vehicle wheel hub portion upon which the wheel is mounted;

DESCRIPTION OF THE PREFERRED EMBODIMENTS

Figure 7:
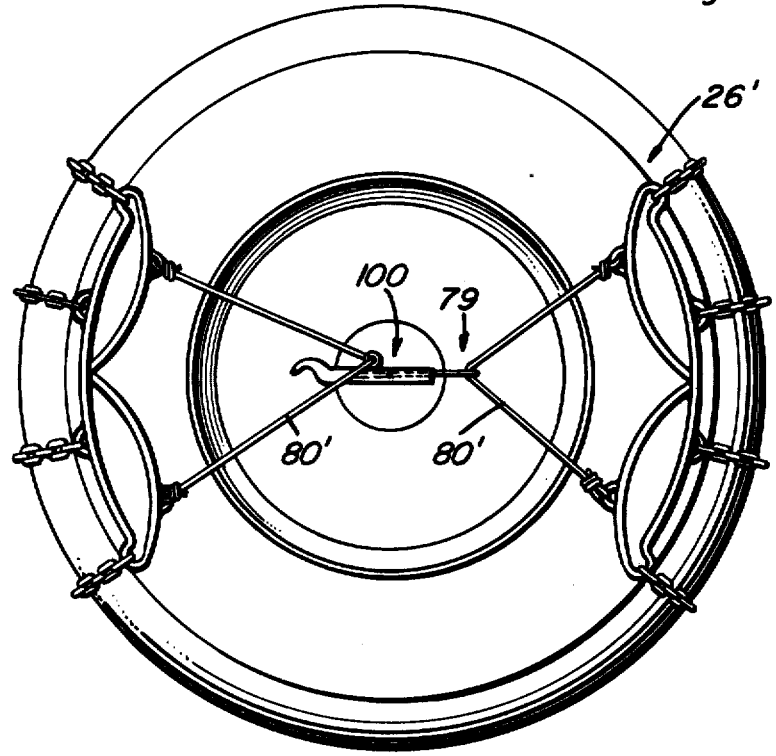
FIG. 7 is a front elevational view of a slightly modified skid chain construction utilizing an adjustable length tensioning assembly of somewhat different configuration.

Referring now more specifically to the drawings, the numeral 10 generally designates a vehicle wheel including a central apertured mounting portion 12 and an outer rim portion 14 upon which a tire 16 including opposite side walls 18 and 20 and a connecting tread portion 22 is mounted.

The numeral 24 generally designates a hub or brake drum portion upon which the central mounting portion 12 of the wheel 10 is conventionally mounted by means of a pattern of mounting studs projecting outwardly from the outer side of the brake drum portion 24 secured through the central mounting portion 12 by means of suitable nuts.

The vehicle wheel skid chain construction of the instant invention is referred to in general by the reference numeral 26 and includes a mounting plate adapter referred to in general by the reference numeral 28 and including a central portion 30, generally radially outwardly projecting mounting arms 32 and attaching links 34 pivotally secured to the outer ends of the mounting arms 32. The mounting arms 32 include root end portions 36 anchored to peripherally spaced portions of the central portion 30 and outer end portions 38 which are inclined outwardly toward the same side of the central portion 30. Further, the central portion 30 includes a plurality of apertures 40 arranged in predetermined pattern for receiving the aforementioned brake drum portion supporting mounting studs therethrough. The outer ends of the outer end portions 38 terminate in outer terminal end portions 42 which are substantially coplanar and parallel the plane in which the central portion 30 is disposed. Corresponding ends of the attaching links 34 are pivotally secured to the terminal end portions 42 by means of pivot fasteners 44 and the outer end portions of the attaching links 34 include outwardly projecting headed studs 46.

The skid chain construction 26 includes pairs of skid chain assemblies referred to in general by the reference numeral 48 and each pair of skid chain assemblies includes two pairs of inner and outer arcuate anchor assemblies 50 and 52. The anchor assemblies 52 include an arcuate member 54 including opposite end and spaced central portion loops 56 and 58 to which corresponding ends of a plurality of flexible cross chain sections 60 are secured. The anchor assemblies 52 each further includes oppositely and inwardly bowed segments 62 including one pair of ends formed integrally with the corresponding end loops 56 and a second pair of adjacent ends secured together and to the mid-portion of the arcuate member 54 as at 64. Each of the segments 62 includes an anchor loop 66 intermediate its opposite ends and it will be noted that the arcuate members 54 and segments 62 are constructed of rigid but somewhat flexible rod stock.

The anchor assemblies 50 are similar to the anchor assemblies 52 in that they include arcuate members 68 corresponding to the arcuate members 54 including loops 70 and 72 corresponding to the loops 56 and 58. Also, the anchor assemblies 50 include inwardly bowed segments 74 corresponding to the segments 62. However, the segments 74 do not include loops corresponding to the loops 66 but instead are bridged at their adjacent ends by means of a keyhole opening defining bridge structure 76 with which the headed shanks 46 are readily releasably engageable.

A tension member assembly referred to in general by the reference numeral 78 is provided and connected between the anchor assemblies 52 of each pair of skid chain assemblies 48 and each tension member assembly 78 includes a pair of elongated flexible tension members 80 having its opposite ends anchored to the corresponding loop 66. Further, each tension member assembly 78 includes an adjustable length center section referred to in general by the reference numeral 82 and including first and second outer and inner elongated members 84 and 86 telescopingly threadedly engaged with each other. The opposite ends of the members 84 and 86 are anchored to the mid-portions of the elongated flexible tension members 80 and the end of the member 84 into which the member 86 is telescoped includes a bifurcated spring latch member 88 between whose furcations 90 and 92 selected radially outwardly projecting pins 94 carried by the adjacent end of the inner member 86 may be engaged. In this manner, the central adjustable length portion of the tension member assembly 78 may be secured in adjusted length.

In operation, when it is desired to secure the skid chain assembly 48 to the tire 16 and wheel 10, upon the assumption that the mounting adapter plate 28 has already been mounted between the inner side of the central mounting portion 12 of the wheel 10 and the associated brake drum portion 24, the bridging structures 76 of the anchor assemblies 50 are releasably engaged with the corresponding headed studs 46 and the tension member assembly 78 is secured between the loops 66 carried by the anchor assemblies 52. Then, the adjustable length central portions 82 of the tension member assembly 78 may be tightened and secured in adjusted position to clamp the skid chain assemblies 48 about diametrically opposite portions of the tire 16.

Although the skid chain construction 26 may include only one pair of skid chain assemblies 48, it will be noted from FIGS. 1, 2 and 3 of the drawings that two pairs of skid chain assemblies 48 may be utilized to make up the skid chain construction 26.

Figure 8:
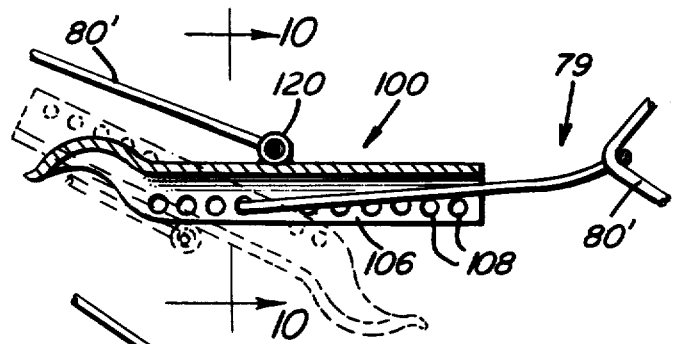
FIG. 8 is a vertical sectional view on somewhat of an enlarged scale and taken substantially upon a plane passing through the center of the modified form of adjustable length tension assembly.
Figure 9:
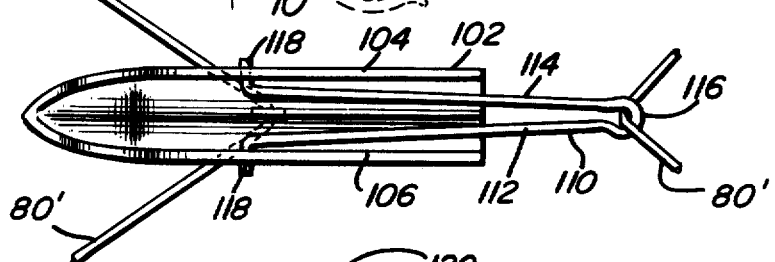
FIG. 9 is a rear elevational view of the modified form of adjustable length tension assembly.
Figure 10:
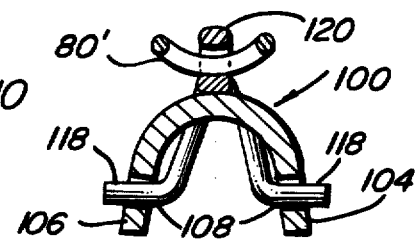
FIG. 10 is an enlarged vertical sectional view taken substantially upon the plane indicated by the section line 10—10 of FIG. 8.

With attention now invited more specifically to FIGS. 7 through 10 of the drawings there may be seen a modified form of skid chain construction referred to in general by the reference numeral 26'. The skid chain construction 26' is substantially identical to the skid chain construction 26, except for the central portion of the tension member assembly utilized in conjunction therewith. Accordingly, portions of the skid chain construction 26' which are identical to corresponding portions of the skid chain construction 26 have been identified by corresponding prime reference numerals.

Instead of utilizing an adjustable length central portion such as the central portion 82 in the tension member assembly 79 of the skid chain construction 26' in conjunction with the elongated flexible tension member 80' corresponding to the tension members 80, an adjustable length central section referred to in general by the reference numeral 100 is provided. The central section 100 includes an elongated channel-shaped lever 102 including opposite side flanges 104 and 106 provided with registered apertures 108 spaced therealong. A bail member 110 including opposite side legs 112 and 114 connected at one pair of ends by means of an integral curved bight portion 116 looped about the mid-portion of the corresponding elongated flexible tension member 80 is provided and the ends of the legs 112 and 114 remote from the bight portion 116 include outwardly directed terminal ends 118 which are rotatably receivable in selected pairs of registered apertures of bores 108. In addition, the central portion of the channel-shaped lever 106 includes an attaching eye 120 through which the mid-portion of the other elongated flexible tension member 80' is received. Accordingly, it may be seen that the lever 106 may be oppositely swung past an over-center position to lengthen and shorten the adjustable length center section 100 and to thereby loosen and tighten the elongated flexible tension members 80'. Accordingly, the operation of the skid chain assembly 26' is substantially identical to the operation of the skid chain assembly 26, with the exception that a different type of adjustable length center section of the tension member assembly is utilized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A skid chain construction including at least one pair of skid chain assemblies, each of said skid chain assemblies including a pair of generally arcuate and parallel anchor assemblies, a plurality of elongated flexible traction members extending between and secured to corresponding portions of said anchor assemblies spaced therealong, a mounting adapter plate including a central portion provided with a pattern of apertures formed therethrough for registry with the wheel mounting lugs of a vehicle hub portion upon which a vehicle wheel may be mounted, said adapter plate being adapted for clamped mounting between the inner side of the central portion of a vehicle wheel and the vehicle hub portion upon which the wheel is mounted, said adapter plate including a pair of generally radially outwardly projecting diametrically opposite mounting arms including outer end portions deflected outwardly to the same side of said plate, mounting means carried by the outer end portions of said arms to which the mid-portions of one pair of corresponding anchor assemblies are releasably anchored for oscillation about axes disposed generally normal to the plane containing the central portion of said plate, and an elongated adjustable length tension member assembly extending between and anchored to the other pair of corresponding anchor assemblies.

2. The combination of claim 1 wherein said mounting means include a pair of elongated arm extension attaching links having one pair of corresponding ends pivotally anchored to the outer end portions of said arms for oscillation about axes disposed generally normal to said plane and a second pair of corresponding ends to which said mid-portions of said one pair of anchor assemblies are releasably anchored.

3. The combination of claim 1 wherein said mid-portions of said one pair of anchor assemblies include means defining partial cylindrical recesses disposed in planes generally paralleling the planes in which said one pair of arcuate anchor assemblies are disposed and opening outwardly away from the centers of curvature of said one pair of anchor assemblies, the second pair of corresponding ends of said attaching links including laterally outwardly projecting headed studs removably oscillatably receivable in said recesses.

4. The combination of claim 1 wherein said elongated adjustable length tension member assembly includes a pair of elongated flexible tension member assemblies each having their opposite ends anchored to the opposite end portions of one of said other pair of anchor assemblies, and an adjustable length assembly having its opposite ends anchored to the mid-portions of said elongated flexible tension member assemblies.

5. The combination of claim 4 wherein each of said elongated tension member assemblies comprises a single elongated flexible tension member extending between the corresponding anchor assemblies.

6. The combination of claim 4 wherein each of said adjustable length assemblies includes inner and outer relatively telescoped and threadedly engaged elongated members including coacting means releasably retaining said elongated members in adjusted relatively angularly displaced positions.

7. The combination of claim 1 wherein each of said arcuate anchor assemblies includes an arcuate rod-like main body portion and a pair of shorter radius arcuate segments disposed in end-to-end relation along an opening toward the concave side of said main body portion, the remote ends of said segments being rigidly anchored to the opposite ends of said main body portion and the adjacent ends of said segments being rigidly anchored to the mid-portion of said main body portion.

8. The combination of claim 7 wherein said rod-like main body portions each include integral attaching loops spaced therealong to which the corresponding ends of the associated traction members are anchored.

9. The combination of claim 1 wherein said elongated adjustable length tension member assembly includes a pair of elongated flexible tension member assemblies each having their opposite ends anchored to the opposite end portions of one of said other pair of anchor assemblies, and an adjustable length assembly having its opposite ends anchored to the mid-portions of said elongated flexible tension member assemblies, each of said adjustable length assemblies includes a toggle assembly including an actuating lever swingable past a center position.

* * * * *